US012746612B2

(12) United States Patent
Kleinbach et al.

(10) Patent No.: US 12,746,612 B2
(45) Date of Patent: Sep. 29, 2026

(54) METHOD FOR SHAPING A PERIODIC STRUCTURE, IN PARTICULAR A TOOTHING, AND LIFTING CAM

(71) Applicant: GLEASON-PFAUTER MASCHINENFABRIK GMBH, Ludwigsburg (DE)

(72) Inventors: Kurt Kleinbach, Beilstein (DE); Amine Zaghbib, Ludwigsburg (DE); Simon Kern, Ludwigsburg (DE); Sven Mayer, Ludwigsburg (DE)

(73) Assignee: GLEASON-PFAUTER MASCHINENFABRIK GMBH, Ludwigsburg (DE)

( * ) Notice: Subject to any disclaimer, the term of this patent is extended or adjusted under 35 U.S.C. 154(b) by 483 days.

(21) Appl. No.: 18/555,028

(22) PCT Filed: Apr. 19, 2022

(86) PCT No.: PCT/EP2022/060233

§ 371 (c)(1),
(2) Date: Oct. 12, 2023

(87) PCT Pub. No.: WO2022/223513

PCT Pub. Date: Oct. 27, 2022

(65) Prior Publication Data

US 2024/0123528 A1 Apr. 18, 2024

(30) Foreign Application Priority Data

Apr. 19, 2021 (DE) ..................... 10 2021 002 058.8

(51) Int. Cl.
*B23F 5/16* (2006.01)
*B23F 1/04* (2006.01)
(Continued)

(52) U.S. Cl.
CPC .................. *B23F 5/16* (2013.01); *B23F 1/04* (2013.01); *B23F 5/12* (2013.01); *B23F 17/00* (2013.01);
(Continued)

(58) Field of Classification Search
CPC .......... B23F 5/16; B23F 5/12; B23F 23/1287; Y10T 409/10–109699; Y10T 409/105247
(Continued)

(56) References Cited

U.S. PATENT DOCUMENTS 3,318,194 A * 5/1967 Bean .................. B23F 23/1287 409/48
3,823,641 A * 7/1974 Seiberlich ................ B23F 5/16 409/34

(Continued)

FOREIGN PATENT DOCUMENTS

CN 203711965 U * 7/2014
DE 1296485 B 5/1969

(Continued)

OTHER PUBLICATIONS

Machine Translation of JP 2004-154921 A, which JP '921 was published Jun. 3, 2004.*

(Continued)

*Primary Examiner* — Erica E Cadugan
(74) *Attorney, Agent, or Firm* — Robert L. McDowell

(57) ABSTRACT

The invention relates to a method for shaping a periodic structure, in particular a toothing on a workpiece, wherein a lifting mechanism lifts the shaping tool, within the working stroke, off of the workpiece for the return stroke after a machining operation, characterized by a rotational angular region of the lifting cam functionally assigned to a circumferential cam profile region of a lifting cam, the same driven to rotate by a motor, of the lifting mechanism, which
(Continued)

Figure 1:
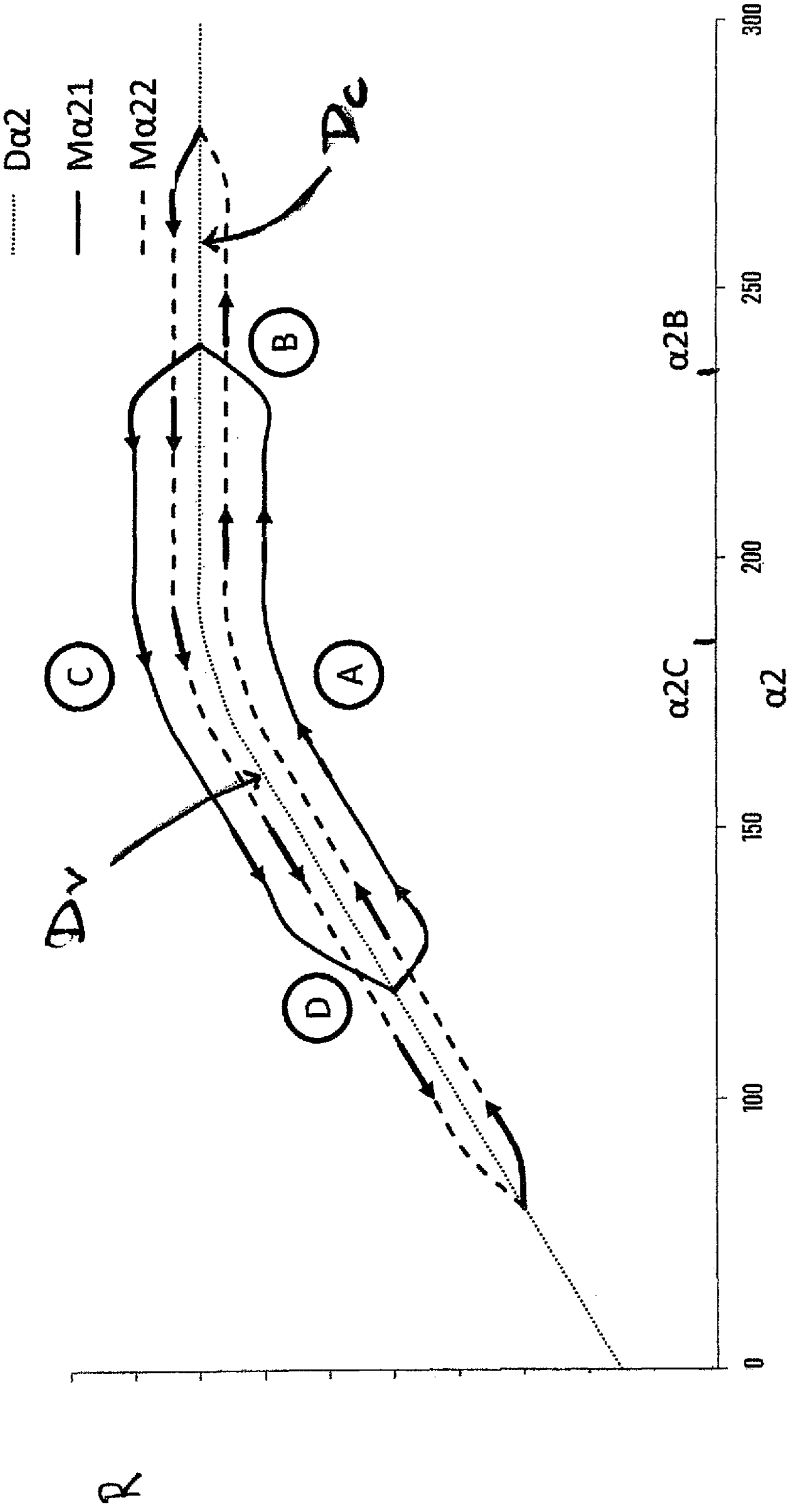

circumferential cam profile region determines the engagement distance between the shaping tool and the workpiece in a working stroke portion of a stroke cycle, wherein the rotational angular region of the lifting cam is passed through a further time—albeit in the opposite direction of rotation—during the same stroke cycle.

16 Claims, 9 Drawing Sheets

(51) Int. Cl.

| | |
|---|---|
| ***B23F 5/12*** | (2006.01) |
| ***B23F 17/00*** | (2006.01) |
| ***B23F 23/00*** | (2006.01) |
| ***B23Q 15/007*** | (2006.01) |
| *B23F 23/12* | (2006.01) |
| *B23Q 1/68* | (2006.01) |

(52) U.S. Cl.
CPC .......... *B23F 23/006* (2013.01); *B23Q 15/007* (2013.01); *B23F 23/1287* (2013.01); *B23Q 1/68* (2013.01); *Y10T 409/105247* (2015.01); *Y10T 409/10795* (2015.01)

(58) Field of Classification Search
USPC .......................................................... 409/1–62
See application file for complete search history.

(56) References Cited

U.S. PATENT DOCUMENTS

| | | | | | |
|---|---|---|---|---|---|
| 9,868,169 | B2 | 1/2018 | Kikuchi et al. | | |
| 2005/0129474 | A1 | 6/2005 | Winfough et al. | | |
| 2008/0112770 | A1 * | 5/2008 | Haas | B23F 5/16 | 409/33 |
| 2011/0262239 | A1 * | 10/2011 | Tokawa | B23F 23/006 | 409/34 |
| 2012/0301241 | A1 * | 11/2012 | Maruyama | B23F 1/04 | 409/38 |
| 2022/0219253 | A1 * | 7/2022 | Kleinbach | B23F 1/04 | |

FOREIGN PATENT DOCUMENTS

| | | | | |
|---|---|---|---|---|
| DE | 102006052474 | A1 | | 5/2008 |
| DE | 102019004429 | A1 | * | 1/2020 |
| DE | 102019004299 | A1 | | 12/2020 |
| JP | 7-47248 | B2 | * | 5/1995 |
| JP | 2004-154921 | A | * | 6/2004 |
| JP | 2012-218100 | A | * | 11/2012 |
| JP | 2012-218128 | A | * | 11/2012 |

OTHER PUBLICATIONS

Thomas Bausch et al., "Innovative Zahnradfertigung [Innovative gear manufacturing]," 3rd edition, p. 281.
International Search Report and Written Opinion for PCT/EP2022/060233, ISA/EPO, Aug. 12, 2022.
Search Report from the German Patent Office for DE 102021002058.8, Apr. 13, 2022.

* cited by examiner

METHOD FOR SHAPING A PERIODIC STRUCTURE, IN PARTICULAR A TOOTHING, AND LIFTING CAM

The invention relates to a method for shaping a periodic structure, in particular a toothing on a workpiece, wherein a lifting mechanism lifts the shaping tool, within the working stroke, off of the workpiece for the return stroke after a machining operation. The invention also relates to a lifting mechanism of a gear shaping machine.

Such methods for shaping, in particular for shaping toothings, are well known in the art. Their basic principles are described, for example, in Thomas Bausch "Innovative gear manufacturing," 3rd edition, pp. 281 et seq. The cutting speed during the shaping is generated by means of a substantially vertical movement of a shaper cutter in the working stroke of a stroke cycle. The rotation and engagement are synchronized to the rotation of the toothing to be shaped. However, to prevent a return stroke cut, the shaper cutter must be lifted off (radially) from the workpiece toothing in the return stroke.

Despite longer machining times, gear shaping methods, which compete with the methods of hobbing and skiving, are favored primarily in applications in which hobbing is not very suitable—for example, for internal toothings—and also for applications involving interference contours for which both hobbing and skiving are less well-suited due to the axis intersection angle. Nevertheless, sufficiently-high stroke rates are desired, so as to keep machining times adequately short.

With regard to the lifting mechanism, the preferred technology is that of a rotating lifting cam. A desired profile of the path consisting of the stroke and the return stroke is generated via the profiling of the lifting cam, which rotates continuously at a rotational speed corresponding to the stroke rate. In typical designs, such as, for example, as described in DE 10 2019 004 299 A1, a cam profiling with a substantially constant diameter is provided for the working stroke, and a region of decreasing diameter, followed by a region of increasing diameter to return to the diameter of the working stroke, is provided for the return stroke.

In addition, other lifting mechanisms are also known, which are based on linear motors and which bring about a lifting movement by a complex arrangement of bendable plates, as described for example in US 2005/0129474 A1. However, this variant does not appear to have become the preferred approach. In the lifting mechanism disclosed in DE 10 2006 052 474 A1, an implementation via lifting cams is regarded as disadvantageous. Instead, a motor-driven crankshaft, which is coupled to the shaping head via an intermediate lever, is taught. Starting from a rotational angle reference position corresponding to the working stroke, the control of the lifting movement is carried out directly via the NC motor with numerical control. This variant also has not gained significant preference in the market—in any case not within the applicant's awareness.

The problem addressed by the present invention is that of improving a method of the type mentioned at the outset with regard to a combination of satisfactory machining speed and satisfactory machining precision.

This object is achieved by means of a shaping method according to the type mentioned at the outset, which is substantially characterized by a rotational angular region of the lifting cam functionally assigned to a circumferential cam profile region of a lifting cam, the same driven to rotate by a motor, of the lifting mechanism, which circumferential cam profile region determines the engagement distance between the shaping tool and the workpiece in a working stroke portion of a stroke cycle, wherein the rotational angular region of the lifting cam is passed through a further time—albeit in the opposite direction of rotation—during the same stroke cycle.

The invention is based on the finding that, despite the control of the engagement distance between the shaping tool and the workpiece in the working stroke, and also the lifting of the shaping tool from the workpiece in the lifting movement by the profile of the lifting cam (rotary lifting cam), an influence on the lifting movement can be achieved by driving the lifting cam with a direction of rotation which changes at least twice, in particular exactly twice, in a stroke cycle (i.e., twice per double-stroke), rather than continuously with the same direction of rotation, as is conventional. In this case, the rotational angular region which corresponds to the cam profile region in the working stroke portion is passed through at least twice, that is to say at least a second time, with a reversed direction of rotation relative to a first time. Preferably, the working stroke portion is assigned a rotational angular region of the lifting cam which is preferably at least 5°, more preferably at least 10°, in particular at least 20°, enabling a lifting movement starting from a lifting cam already accelerated to a certain angular velocity. Assigned rotational angular regions of 25° or more, even of 30° or more, are also possible.

As such, the rotational angular region in the working stroke portion (at least in parts thereof) can be used as an azimuthal acceleration path. The angular velocity of the lifting cam during the lifting should preferably be at least 5 rpm, more preferably at least 20 rpm, in particular at least 35 rpm. The expression "azimuthal" refers in this case and below to the angular rotation (angle in the circumferential direction) of the rotary cam, such that it is therefore an angular acceleration path.

It goes without saying that, even in the return stroke, an angular region of the lifting cam assigned thereto is passed through twice. In this respect, it is preferably provided that there is a movement reversal point in the return stroke and a movement reversal point in the working stroke. This favors efficient utilization of the stroke length for the engagement with the toothing. In principle, it is also conceivable kinematically to place both reversal points in the upward or downward movement of the shaping head.

In one embodiment, the cam profile region which is assigned to the rotational angular region which is passed through twice, and which determines the engagement distance between the shaping tool and the workpiece, can be of a constant diameter. However, there are also variants in which this engagement-determining cam profile region can also have a modulated diameter, for example for flank profile line changes of the shaped toothing.

The toothing can preferably be an internal toothing, but the method is also suitable for external toothings. As will be explained in more detail later, by means of a single cam, a lifting movement for the shaping of internal toothings, as well as a lifting movement for the shaping of external toothings, can be realized.

In a particularly preferred embodiment, the azimuthal position of the movement reversal point in the return stroke (angular position of the reversal point) on the lifting cam is variably adjustable, and, in particular, is adjusted in a later stroke cycle of the machining of the workpiece to a position which brings about a lower degree of lifting. With this method configuration, the configuration according to the invention comes with the advantage that it is easy to achieve different degrees of lift. Specifically, they can be achieved in that the cam profile region assigned to the return stroke has at least in certain regions a diameter (or radius) which increases during passage in one direction of rotation and decreases accordingly during passage in the other direction of rotation—accordingly, in one possible embodiment, constituting a ramp which is, in particular, linear. The movement reversal point is displaced further upward or downward on this ramp by means of numerical control of the cam rotation. In this way, for example, a toothing which is shaped over multiple revolutions (regardless of the strategy used for the advancing movement) can be processed in the return stroke in a first number of rough-machining strokes with a greater degree of lift, and in a finish-machining stroke in the return stroke, or a second number of finish-machining strokes with a smaller lifting movement, such that a higher machining accuracy can be achieved. It is even conceivable to adjust the degree of lift in the return stroke of each stroke cycle (double stroke) individually and differently, for example as a function of the advancement selected in the respective working strokes.

In a simple phase relationship, the reversal points of the stroke movement could be shifted by $\pi/2$ with respect to the reversal points of the cam rotation. Then, the movement reversal point of the rotational movement on the working stroke side would substantially correspond to the central stroke position, and the reversal point on the return stroke side of the cam rotation would correspond to the center of the return stroke. It is preferred that this phase relationship deviates by no more than $5\pi/12$, preferably no more than $\pi/3$, and in particular no more than $\pi/4$. In an additional or alternative design, however, compared to such a basic constellation with a $\pi/2$ offset, an additional phase shift of the cam rotation is adjustable by preferably at least $\pi/18$, in particular $\pi/9$, in particular at least $\pi/6$ or even at least $\pi/4$ in the direction of a displacement of the reversal point of the cam rotation on the reverse stroke side in the direction of the end of the return stroke movement. This ensures a displacement of the maximum lifting movement towards the height level of the upper end face of the shaped toothing, where the risk of collision is a particular concern.

In a further design option, the reversal point of the cam rotation on the working stroke side could likewise be displaced with respect to the stroke in the direction of the lower end face of the shaped toothing, in order to enlarge an azimuthal acceleration path. However, depending on the width of the shaped toothing (i.e., the tooth extension in the axial stroke direction) and in particular in the case of comparatively wider toothings, the reversal point of the cam rotation on the side of the movement reversal can also be displaced, with the same phase—with a reversal point on the return stroke side displaced in the direction of the upper end face—accordingly deviating from a symmetrical angular distance of $\pi$ by, as far as possible, no more than $\pi/2$, preferably no more than $\pi/3$, more preferably no more than $\pi/4$, in particular no more than $\pi/6$. This increases the smoothness of the cam movement.

In principle, it is conceivable to configure the entire rotational angular region of 360° ($2\pi$) of the cam with a cam profile region for the working stroke and a cam profile region for the return stroke, which, depending on the actuation thereof, are only utilized up to a certain fraction thereof, according to the desired lifting movement. In a further preferred configuration, however, it is provided that, in addition to these cam profile regions with the associated rotational angular regions, there is also a remaining free rotational angular region, which can be used for one or more different cam profilings, and can be applied accordingly.

For example, three rotational angular regions with associated cam profile regions could be provided: in a simple configuration, one region with a constant radius for a working stroke of an external toothing or internal toothing shaping, one region for the return stroke for shaping an external toothing, and one region for the return stroke for shaping an internal toothing. In this way, it would not be necessary to change out the cams for a machining change from shaping external toothings to shaping internal toothings. The possibility of being able to adjust the degree of lift both for shaping the internal toothing and for shaping the external toothing, in particular the possibility of making a continuous adjustment, is preserved as per the above explanation. It goes without saying that a separate angular region for the working stroke for the internal toothing machining, as well as for the external toothing machining, could also be provided for this example. However, a joint use of both methods with respect to the working stroke is possible.

If the three described segments are further compressed for this example described above, for example to a total extension of 180° ($\pi$), it is also conceivable to apply a further cam profiling on the same cam, with which a radial variation can also be realized within the working stroke for flank profile line modifications of the shaped toothing, such as a width crowning or conicity. These designs can also be combined by, for example, using the cam profile region modified for producing a width crowning for both the machining of internal toothings and also the machining of external toothings, by providing corresponding profilings for the return stroke for one or the other side.

In this respect, it can thus be provided that this third azimuthal region (angular region) is also profiled in some regions for a lifting process, but with a different profiling, and in particular for a lifting process of another workpiece type, other workpiece, or an earlier or later stroke cycle of the same workpiece and/or for a working stroke with flank modifications of the shaped toothing which are modified at least in part via these profiling.

If the angular region of the lifting cam passed through in a stroke cycle is considered as a function of time, a periodic function that correlates with the frequency of the stroke cycle is provided.

The time derivative of this periodic function, and in particular the latter itself, is particularly preferably sinusoidal or is a modulated sinusoidal wave. That is to say, a sinusoidal 1st order is dominant, and/or at least two changes from one direction of curvature to the other direction of curvature are present within one period; at least two contiguous regions are present, of which one is located above and the other below a center line, and such a center line is crossed at least twice within a period. Without possible tooth flank modifications, such a function could also correspond in particular to an exact sinusoidal radius, wherein, as already explained above, with amplitude, phase shift, and zero point shift for the amplitude, three parameters are available for the actuation of the cam rotation, to adjust the reversal points of the cam rotation with respect to the phase position of the stroke movement. Moreover, it is also provided that the lifting movement, as well as the change of cam direction, are carried out with the lowest possible/minimum jerk. For this purpose, it is preferably provided that the periodic function and, in particular, also its derivation, are in particular continuously differentiable twice.

In a further preferred configuration, it is provided that the quotient of maximum amplitude of the angular velocity (time derivative of the function of the angle of rotation of the lifting cam) and the cycle time is less than 24 rpm/s, preferably 16 rpm/s, in particular 8 rpm/s. In this way, no excessive accelerations arise which could have a negative effect on the machining quality.

In a further preferred method configuration, it is provided that the stroke rate of the processing, in strokes per minute, is greater than 50, preferably 150, more preferably 200, and in particular greater than 250. Due to the above-described available azimuthal acceleration paths, a reliable lifting movement can be accomplished, and a return stroke pass can be prevented despite the reversal of the movement direction of the cam rotation, even at high stroke rates. It is understood that significantly higher values of 400 or higher, 800 or higher, even 1200 or higher can be used.

In a further preferred configuration, the periodic function of the angle of the lifting cam as a function of time includes modifications which serve to create flank profile line modifications of the shaped toothing, also in the form of, for example, (at least) four curvature changes within one period. In this way, a modulation, for example of a sinusoidal function, can be provided, which can compensate for a stroke speed that is not constant during the working stroke when generating a width crowning desired only in the center of the tooth.

In a preferred structural design for carrying out the method, it is provided that the shaping head is mounted so as to be pivotable about an axis, and the lifting movement takes place by pivoting the shaping head. Furthermore, the lifting mechanism can have a preloaded pressure roller arranged between the lifting cam and the pivotable shaping head region.

The invention also relates to a control program with control instructions which, when executed on a control device of a shaping machine, controls the shaping machine for performing a method according to any of the aforementioned aspects. Furthermore, the invention also provides a rotary lifting cam of a lifting mechanism of a shaping machine, having a first circumferential cam profile region for adjusting the relative distance between the shaper cutter and the shaped workpiece in a first operating mode, and a second circumferential cam profile region for adjusting such a relative position in a second operating mode, with a different path of the relative movement compared to the first operating mode. As already explained above, these different cam profile regions realized on a single lifting cam can include, for example, the lifting movement during the shaping of an internal toothing opposite that of an external toothing, a modified working stroke, for example for modifications of the shaped toothing, in particular flank profile line modifications such as crowning, end tapering or conicity, or also combinations thereof.

Finally, the invention also provides a shaping machine having a control program for carrying out such a method and/or having such a lifting cam. A numerical control rotary motor for rotating the rotary cam is preferably a synchronous motor, for example with a coupling, or an assembly synchronous motor, as can be commercially available from relevant manufacturers.

Figure 2:
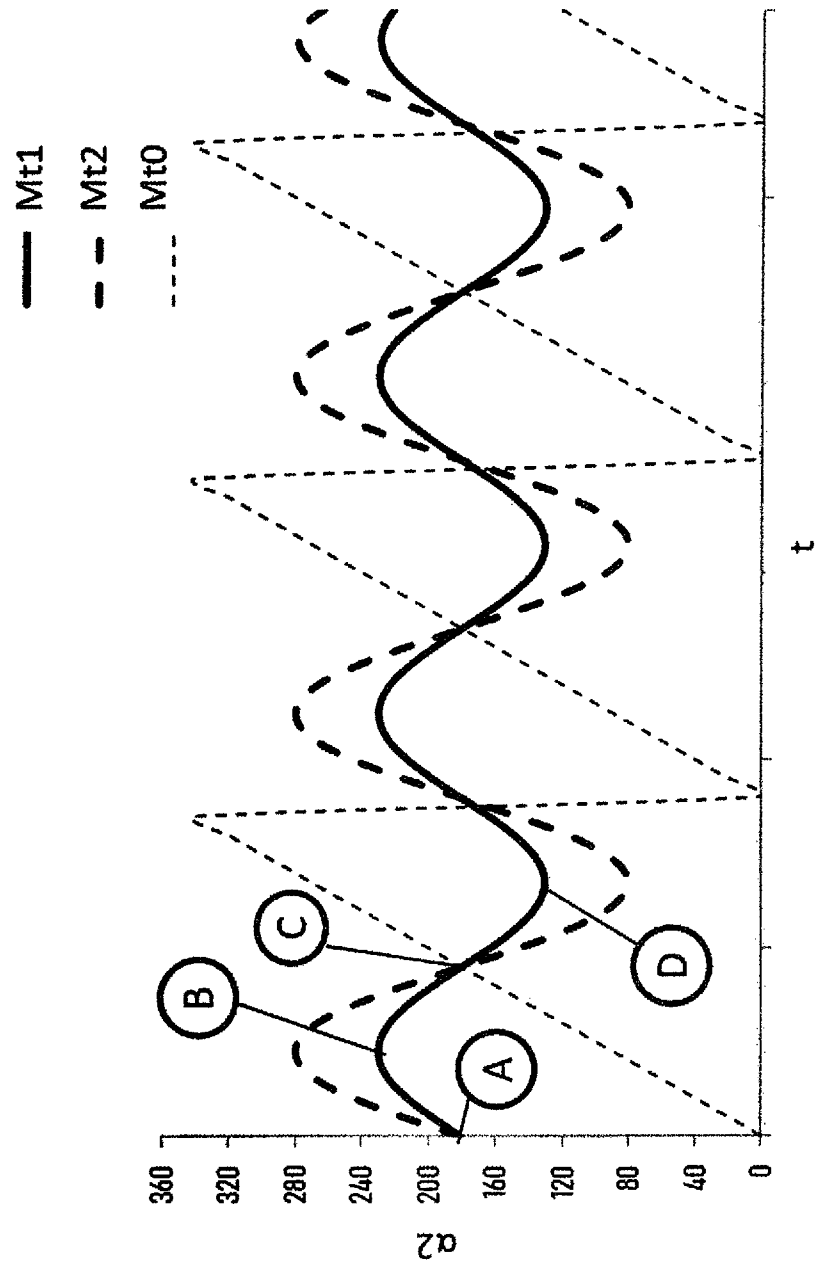
Figure 3:
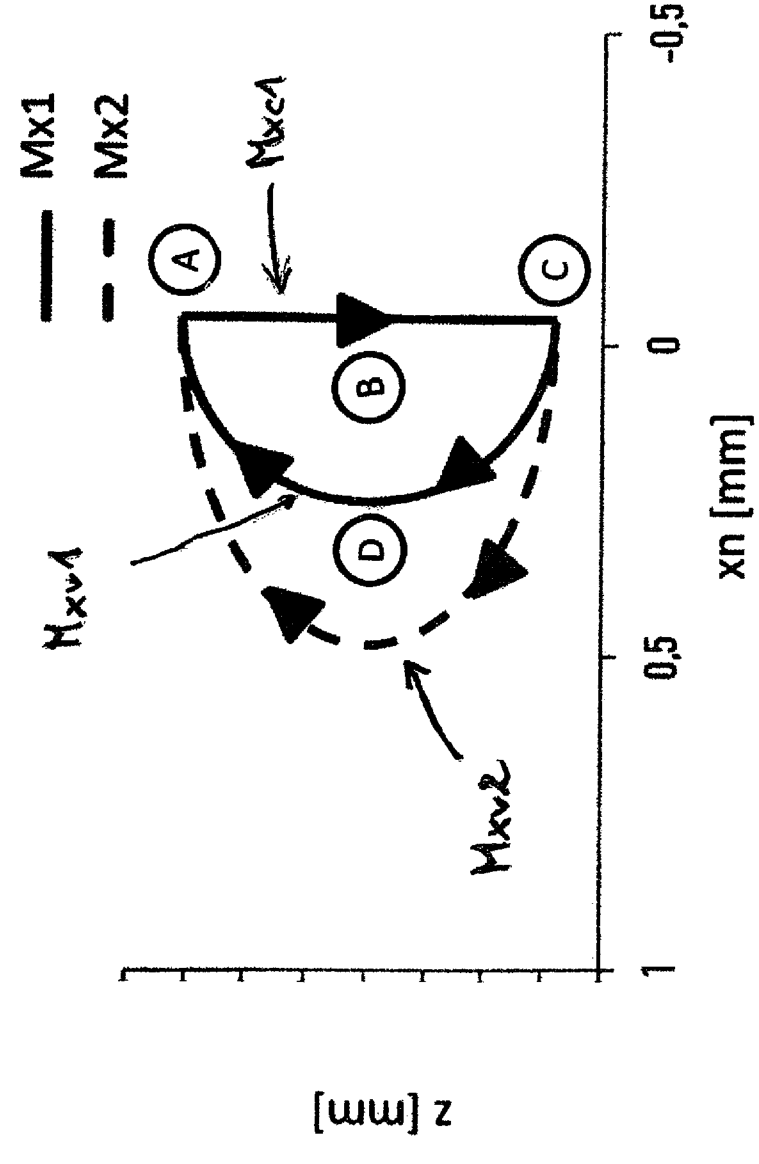
Figure 4:
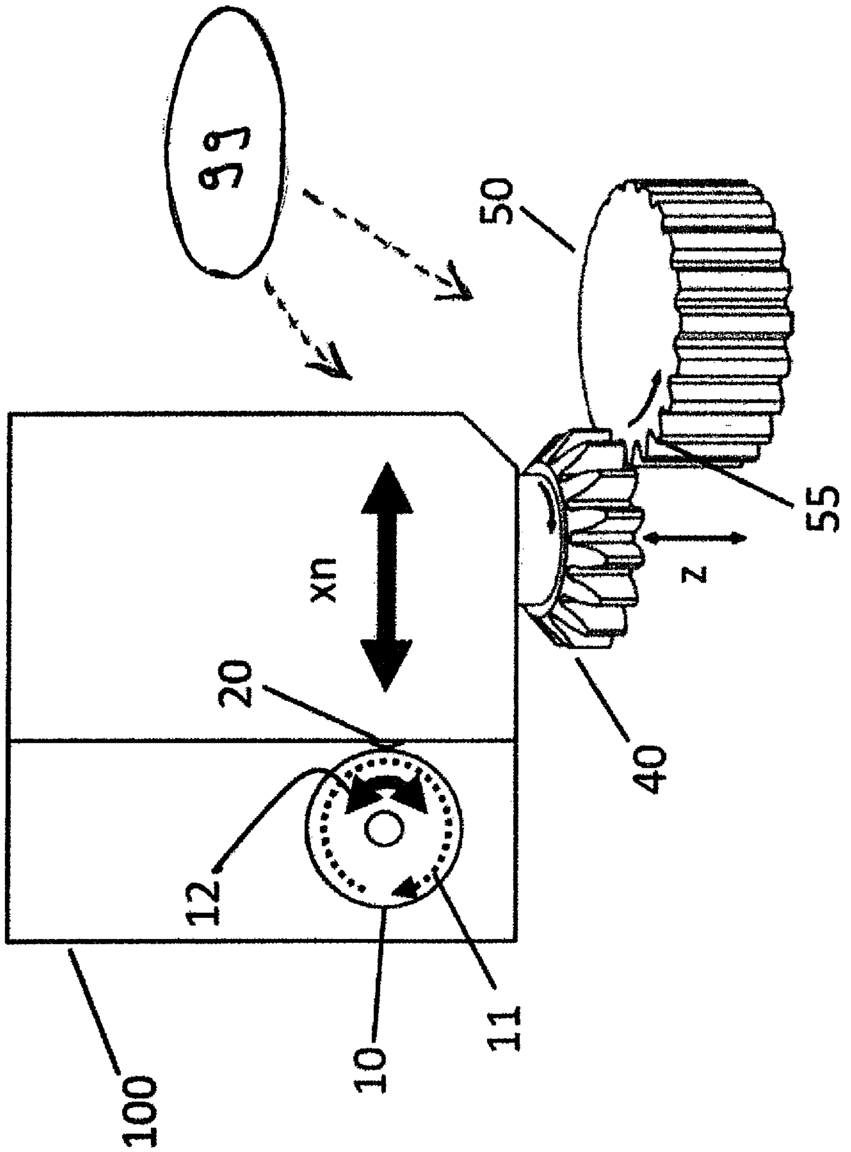
Figure 5:
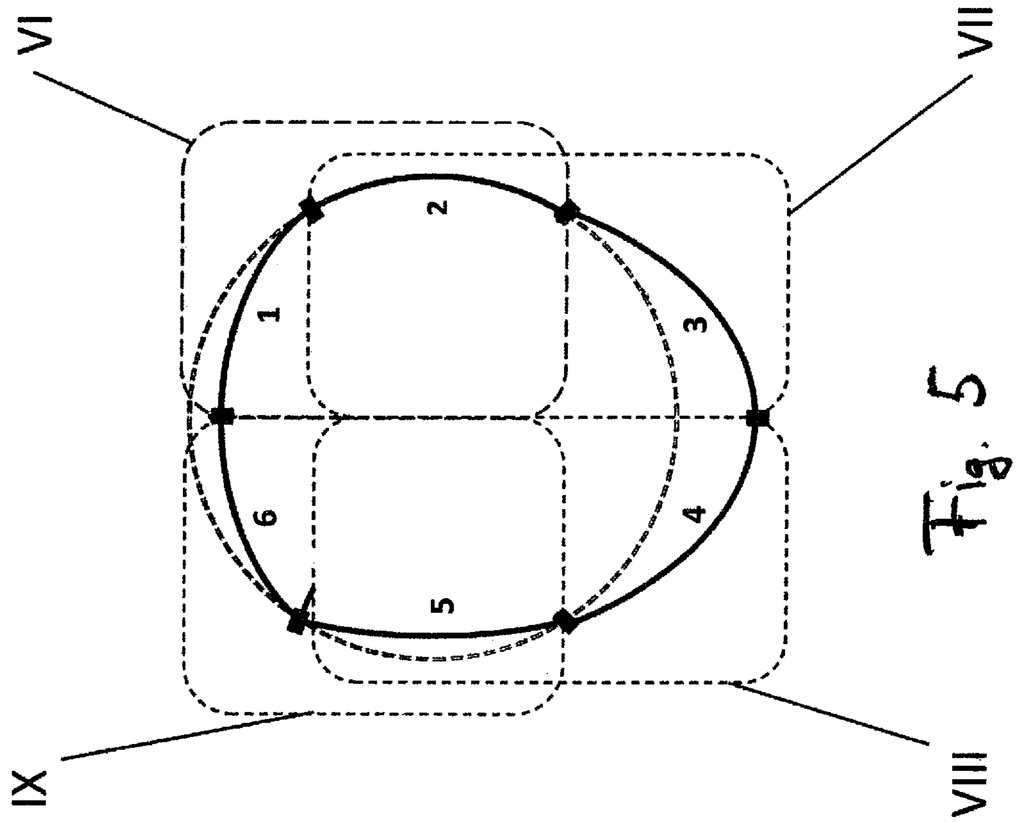
Figure 6:
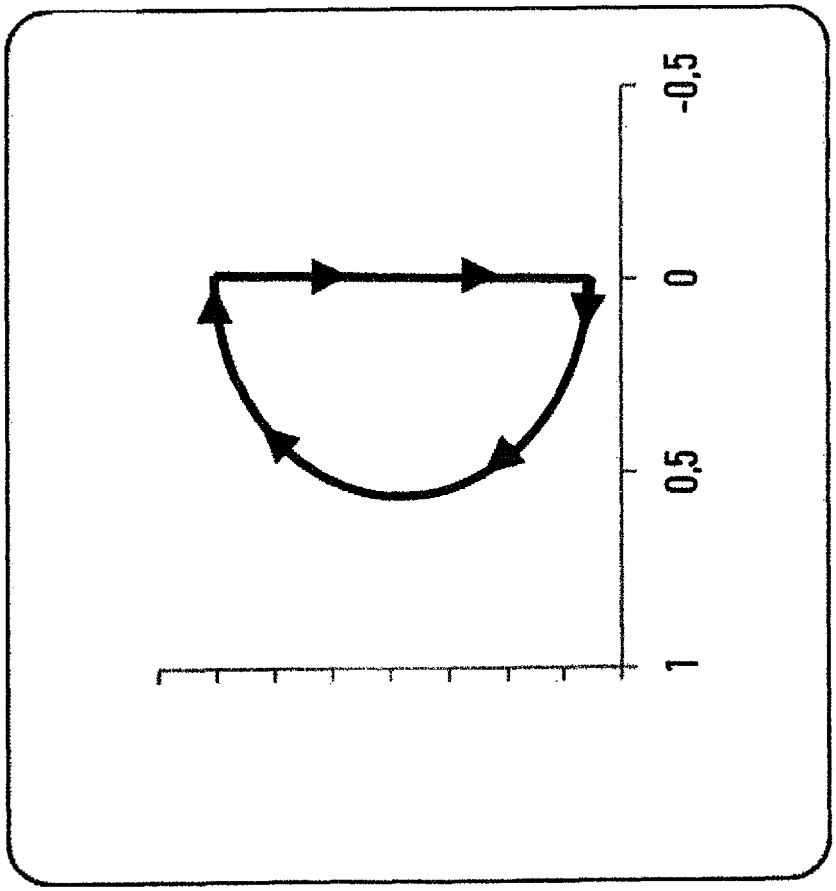
Figure 7:
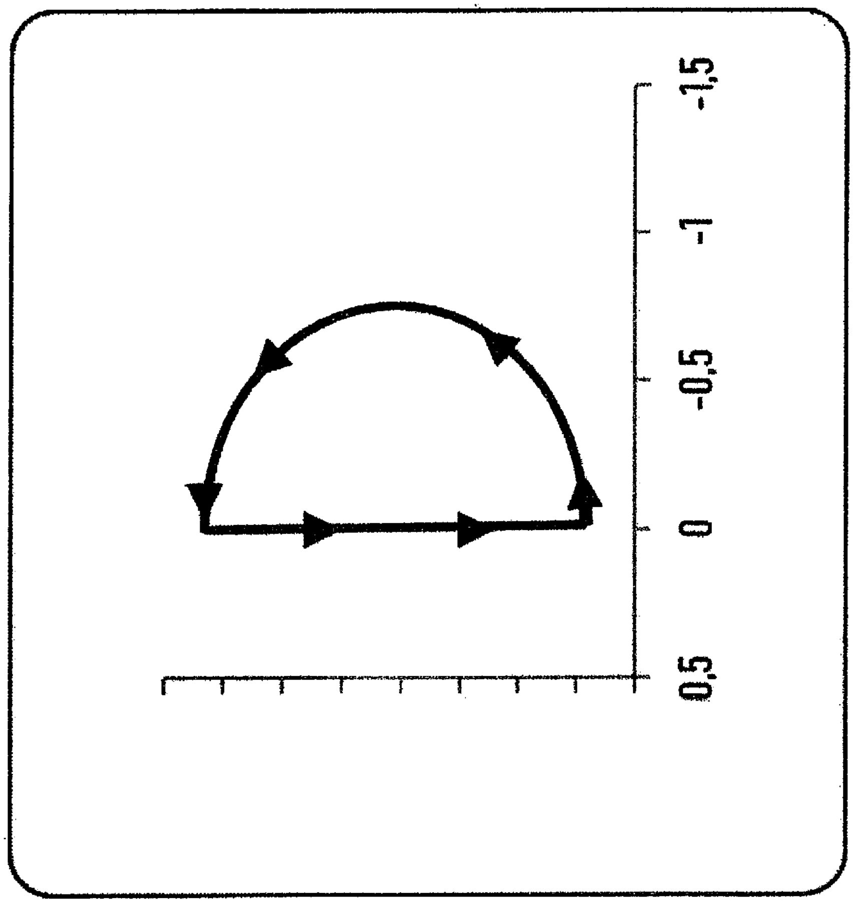
Figure 8:
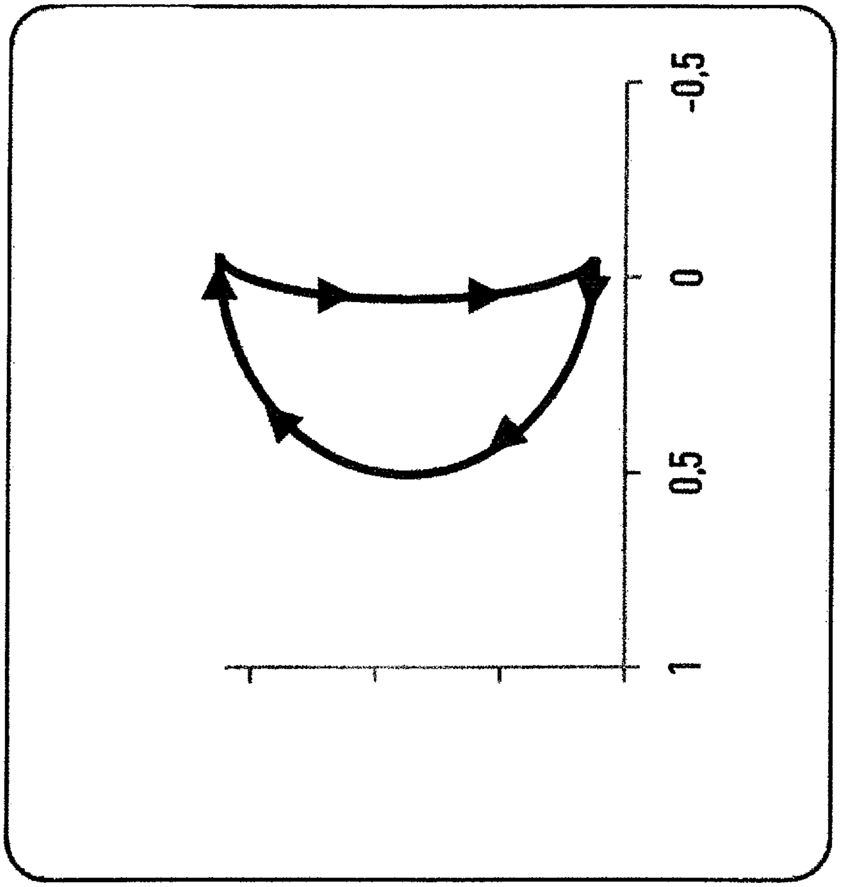
Figure 9:
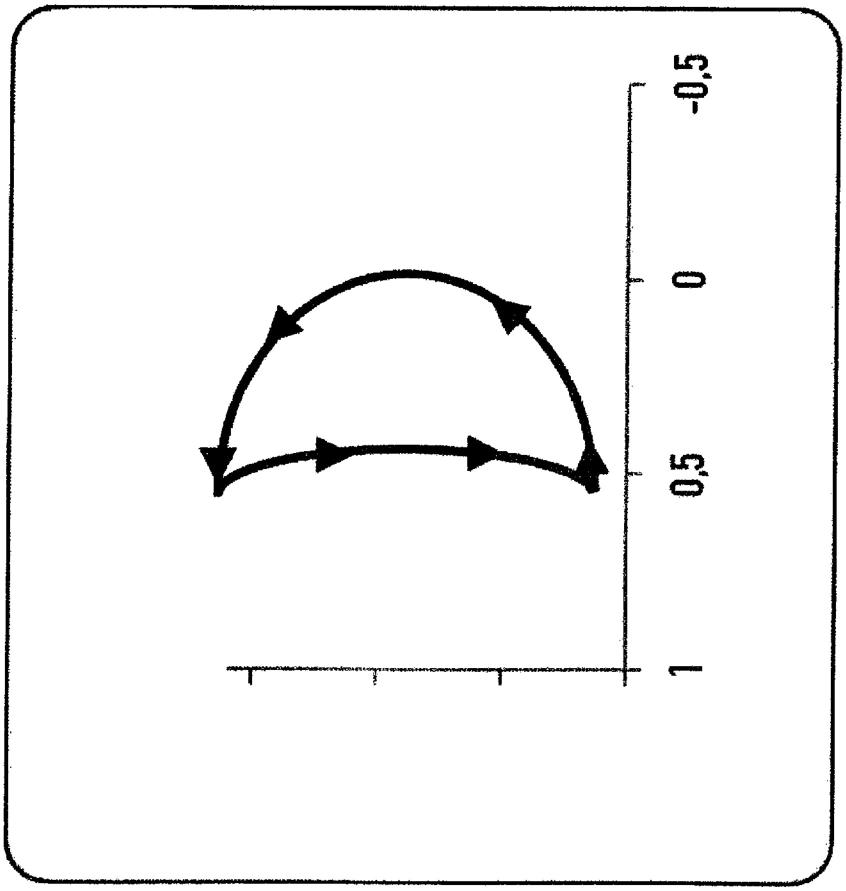

Further features, details and advantages of the invention will be apparent from the following description with reference to the accompanying figures, wherein:

FIG. 1 is an explanatory illustration of cam movement curves,

FIG. 2 is an explanatory illustration of the cam angle as a function of time, FIG. 3 is an explanatory illustration of two lifting movements, FIG. 4 is a schematic illustration of a shaping head with cams, FIG. 5 is a schematic illustration of a cam with different cam segments, FIG. 6 is an explanatory illustration of a lifting movement for the cam region VI of FIG. 5, FIG. 7 is an explanatory illustration of a lifting movement for the region VII of FIG. 5, FIG. 8 is an explanatory illustration of a lifting movement for the region VIII of FIG. 5, and FIG. 9 is an explanatory illustration of a lifting movement for the region IX of FIG. 5.

FIG. 4 schematically shows a shaping head 100 which carries a shaper cutter 40 in order to carry out a toothing shaping machining process for generating a toothing 55 on a workpiece 50. For this purpose, the shaping head executes a stroke movement along the stroke axis shown by the double arrow provided with the reference numeral Z. This is achieved in a known manner by means of a crank drive (not shown), which has a shaping spindle axis (A axis) which is a continuously rotating rotational axis. An illustration of the stroke movement is shown by way of example in FIG. 3 as an a-Z diagram.

Also not shown in FIG. 4 is a suspension of the shaping head, which enables a lifting movement—illustrated by the double arrow with the reference sign xn—to prevent return stroke collisions. The degree of lift is based on the diameter (and/or radius) of the profiled cam 10, which in FIG. 4 is in contact with a preloaded pressure roller 20 in the 3 o'clock angular position—wherein only one region of the cam is shown in FIG. 4.

In FIG. 4, the direction of rotation of the continuous rotation of the cam used in the prior art reference here, which controls the lifting movement synchronously with the stroke movement, is drawn as a dotted arrow 11. The cam rotation, as well as the other machine axes, are controlled with numerical control; a controller for this is indicated in FIG. 4 with the reference sign 99.

In contrast, the cam rotary movement used in the method according to the invention is represented by a rotation double arrow 12. The cam rotation thus does not take place continuously with the same direction of rotation, but rather the direction of rotation during a (double) stroke is changed, and an angular region in a (double) stroke is passed through more than once—in the present exemplary embodiment, exactly twice—specifically with different directions of rotation of the rotary cam for each passage.

In a representation over time, such as that of FIG. 2, which extends over somewhat more than three full double strokes, this is readily apparent from the example with the bold solid curve Mt1, compared to the thin dashed curve Mt0 of the prior art. The sawtooth-like depiction of the curve Mt0 from the prior art is due to the fact that, after a full rotation of the cam 10, the angle is specified again starting at the zero crossing corresponding to the 360° position. For the curve Mt1 of a first operation, in contrast, only one angular region of approximately 100° is passed over, for the example shown—as a periodic function of time with a period duration corresponding to the period of the double stroke, and in this exemplary embodiment in the form of a sinusoidal curve.

FIG. 1 shows the movement corresponding to curve Mt1 from FIG. 2 in an illustration in which the cam radius is plotted as a function of the cam angle α2. The dotted curve Dα2 represents the profile of the cam in the rotational angular region in question. It has a region of constant radius Dc, and a region Dv in which the radius decreases as a function of the cam angle α2. For illustration purposes and identification of the different directions of rotation, the curve Mα21 is depicted in FIG. 2 above the cam curve Dα2, corresponding to the movement Mt1 for the one direction of rotation below, and the other direction of rotation above. In reality, of course, the curve Mα21 lies on the cam curve Dα2. The effects of the paths Mt1 and Mα21 from FIGS. 2 and 1 on the lifting movement can best be seen in the illustration of FIG. 3, and specifically the momentary situations A, B, C and D also shown in FIGS. 1 and 2.

Momentary situation A describes the beginning of the movement as a working stroke—without a lifting movement—which ends at C. During the working stroke, the radial distance of the shaper cutter 40 from the workpiece 50 should be constant during the working operation (assuming that a width crowning, or conical or other flank profile line modification is not desired). Accordingly, the curve Mα21 from FIG. 2 is passed through in the region Dc of the constant cam radius, specifically from the transition of the varying radius region Dv to the constant radius region Dc via momentary situation B, in which the rotational speed of the cam is reduced to zero after deceleration, and then rises again in the reverse direction of rotation. In the working stroke (without modifications), the position at a given point on the curve Mα21 plays a subordinate role. The specification of the angular velocity ω2 (=dα2/dt) is therefore entirely variable, and the "reversal point" B, where ω2=0, in the region Dc does not have to lie in the center of the stroke as shown in FIG. 3. Rather, it can, in accordance with a phase shift with respect to FIG. 2, lie at a different position than the central position in the axial stroke direction Z.

The angular region [α2B; α2C] in FIG. 1 between the momentary situations B and C can be used as an acceleration path, such that the beginning lifting movement starting from momentary situation C takes place when the angular velocity of the cam can already have a comparatively high value, in particular close to its maximum value. However, it should also be understood here that, by means of the numerical control of the axis α2, the maximum speed of the cam can also be shifted with respect to the lifting movement in FIG. 3. For example, the angular velocity ω2 would not need to begin to decrease starting at the moment of the beginning of the lifting movement. Rather, it could also rise briefly, in order to then decrease, and to rise again starting at momentary situation D, the other "reversal point" with respect to the direction of rotation of the angular velocity. In FIG. 3, the reversal point D, which according to FIG. 1 corresponds to the maximum lifting movement for the selected cam profile Dα2, is also drawn in the center of the axial movement z; however, this could equally well be displaced in the direction of, for example, the end of the return stroke movement Mxv1. With the cam rotation from the reversal point D to the transition of the region Dv into Dc, in momentary situation A in FIG. 1, the lifting movement ends, and the starting point for the example is again reached.

In FIG. 3, a further lifting movement Mx2 is also shown, which in the working stroke (Mxc2) coincides with the movement Mxc1 of the lifting movement Mx1 (with return stroke Mxv1) just discussed; however, in the return stroke, as can be seen by the dashed movement path, is lifted with a comparatively greater degree of lift. This is achieved by rotating the cam (cam angle α2) beyond the region of the "reversal point" D of the previously described movement Mα21 in FIG. 1, by means of the numerical controller 99, and thus passing through a greater angular region in the region Dv, with variable cam radius in the one direction and then in the other direction of rotation, between momentary situations C and A (via D). Accordingly, as can be seen from FIG. 2, setting a greater amplitude for the curve Mt2 with respect to curve Mt1 allows for a greater lifting movement. In the Mα22 path in FIG. 1, a greater angular region is also passed through in the region Dc of the constant cam radius. However, it should again be understood here that the positioning of the "reversal point" B along the region Dc has no influence on the radial distance between the shaper cutter 40 and the workpiece 50, and can thus also be changed in principle (corresponding to a displacement along with stretching/compression of the curves from FIG. 2 in the direction of the vertical axis).

Accordingly, different lift paths can be realized with the same cam, i.e., without cam changes, and the lifting movement can also be realized after passing through an angular acceleration section.

The full peripheral region of the lifting cam is also not required to carry out the lifting movement; the angular region shown in FIGS. 1 and 2 for explanatory purposes, of approximately 100° for the curves/paths Mt1/Mα21 and approximately 200° for Mt2/Mα22, can certainly be reduced further. In a further aspect of the invention, lifting cams can thus also be realized which have different profiling regions for carrying out different lifting movements and/or modulations of the working stroke (beyond the above-explained amplitude adjustment).

This is explained below with reference to FIG. 5, which shows the profiling of a cam in different segments 1 to 6 in a very greatly exaggerated representation. In an illustration which uses times on a clock as angular positions, the drawing shows a first segment 1 between the 0 o'clock position and 2 o'clock position, a second segment 2 between the 2 o'clock position and 4 o'clock position, a third segment 3 between the 4 o'clock position and 6 o'clock position, a fourth segment 4 between the 6 o'clock position and 8 o'clock position, a fifth segment 5 between the 8 o'clock position and 10 o'clock position and a sixth segment 6 between the 10 o'clock position and 12 (0) o'clock position.

The segment 2 has a constant radius and corresponds to the region Dc of FIG. 1. Segment 1 has a radius decreasing in the counterclockwise direction, and corresponds to the region Dv from FIG. 1. The two segments 1 and 2, combined in FIG. 5 as region VI, can be used for shaping external toothings as shown in FIG. 6. A lifting movement of the type of lifting movement Mx1 or Mx2 according to FIG. 3 results, wherein, in turn, by means of numerical control (e.g., amplitude adjustment according to FIG. 2), different degrees of lifting can be set. As explained above with reference to FIG. 3, these can additionally be set continuously via the positioning of the reversal point D.

However, the segment 2 can also be used for shaping internal toothings with which the lifting movement in the radial direction must occur in the opposite direction with respect to the direction in which an external toothing is shaped. For this purpose, segment 3 is provided, which connects to segment 2 on the other side from segment 1, and has a region of a cam radius that rises in the clockwise direction. The region of segment 2 and segment 3, denoted by VII in FIG. 5, can thus be used for shaping internal toothings. the corresponding lifting movement is shown in FIG. 7. Here as well, the variations of the lifting movement explained with reference to FIGS. 1 to 3 can be adjusted in particular with regard to the degree of lift, since, in addition to the angular region of the cam traversed twice (with different directions of rotations), determined by means of a numerical-control adjustment of the angular velocity, there are further degrees of freedom for the speed at which these paths are traversed (variation in the shape of the curve Mt1 in FIG. 2).

The remaining angular region of the cam with the segments 4, 5 and 6 can be used for this purpose, as shown in FIG. 5, to realize topological modifications of the toothing geometry of the workpiece 50. This is initially explained using the example of a flank profile line crowning or width crowning. Segment 6 produces a cam profile that is mirror-symmetric to segment 1—i.e., a region with a cam radius increasing in the counterclockwise direction. This adjoins segment 5, which, however, does not have a constant radius. It is designed in such a way that initially the radius, coming from segment 6, is initially reduced during further rotation, and then increases again approximately starting at the half-way point of the angular region assigned to segment 5. Here as well, the representation of the deviation of constant diameter (symbolized by the double dashed line) is shown highly exaggerated for explanatory purposes. Segments 5 and 6, indicated together by IX in FIG. 5, are used together for the shaping of an external toothing with a toothing modification with width crowning. The lifting movement associated with this is shown in FIG. 9. In comparison to FIG. 6, the comparatively small convex lifting movement can also be seen in the working stroke.

Finally, segment 4, which is designed to be mirror-inverted to segment 3, can be used together with segment 5, as shown in FIG. 5 by VIII, for rolling an internal toothing with width crowning. The associated lifting movement is shown in FIG. 8.

For this exemplary embodiment of a crowning, the degree of lift of the lifting movement in the return stroke can continue to be set via the angular region passed through in the segments 4 (FIG. 8), 6 (FIG. 9), 3 (FIG. 7) and 1 (FIG. 6).

The different lifting movements with different degrees of lift shown by means of FIGS. 1 to 3 can be used not only for shaping toothings of different workpieces, but also for a shaping toothings of one and the same workpiece, by using, for example, the lifting path in the return stroke Mxv2 from FIG. 3 for the return strokes for rough-machining strokes, wherein a smaller lifting movement can be set in the return stroke after the one or more finish-machining passes for one or more finish-machining strokes, by shifting the reversal point and/or the momentary situation D in the direction of the region Dc of constant cam radius. It is understood that, alternatively or in addition to a crowning, other flank profile line modifications, not explicitly illustrated, such as conicities or end taperings, can be realized by modifying a circumferential region of the rotary cam.

As can be seen from the above detailed description of the invention, flexibility in the shaping process is further increased, and downtime, which would otherwise be incurred by removing and installing another cam, can also be reduced.

Moreover, the invention is not limited to the details illustrated in the preceding description. Rather, the individual features of the above description, and in the following claims, may be essential, individually and in combination, for implementing the invention in its different embodiments.

The invention claimed is:

1. A method for shaping a periodic structure on a workpiece, in which method a lifting mechanism (10, 20, 99) lifts a shaping tool (40), after a machining working stroke (Mxc1) of the shaping tool (40), off of the workpiece for a return stroke (Mxv1) of the shaping tool (40) after the machining working stroke, wherein the working stroke and the return stroke define a stroke cycle, wherein the lifting mechanism (10, 20, 99) comprises a lifting cam (10), wherein the lifting cam comprises a rotary cam having a circumferential cam profile extending all the way around a rotational axis of the lifting cam, wherein the circumferential cam profile comprises a partial circumferential angular cam profile region that extends less than all the way around the rotational axis of the lifting cam (10), wherein the partial circumferential angular cam profile region extends from an angular cam profile region beginning point to an angular cam profile region end point, the lifting cam being driven to rotate about the rotational axis by a motor of the lifting mechanism, the method comprising rotating the lifting cam from the angular cam profile region beginning point, which angular cam profile region beginning point is correlated with a beginning of the stroke cycle, to the angular cam profile region end point, which angular cam profile region end point is correlated with an end of the stroke cycle, wherein the partial circumferential angular cam profile region is passed through at least a first time and a second time during the same stroke cycle, with the direction of rotation of the lifting cam during the first time and the second time being opposite to one another, and wherein during the stroke cycle, the lifting cam is constantly rotating except for at time(s) when the lifting cam is at one or more movement reversal points at which the direction of rotation of the cam is reversed.

2. The method according to claim 1, wherein a portion of the partial circumferential angular cam profile region that correlates to the working stroke is used at least in regions as an acceleration path.

3. The method according to claim 1 wherein the one or more movement reversal points comprise a movement reversal point (D) that occurs during the return stroke and/or a movement reversal point (B) that occurs during the working stroke.

4. The method according to claim 1 wherein a movement reversal point, of the one or more movement reversal points of the lifting cam, that occurs during the return stroke is phase-shifted relative to a movement reversal point of the tool during the working stroke cycle, such that the movement reversal point of the lifting cam that occurs during the return stroke is phase-shifted relative to the axial center of the return stroke of the tool by at least $\pi/18$ in a direction towards an end of the return stroke of the tool.

5. The method according to claim 1 wherein a circumferential cam profile region of the lifting cam, which circumferential profile region of the lifting cam is assigned to the return stroke, determines a lifting movement of the shaping tool, wherein the lifting cam has a cam profile region assigned to the working stroke, and wherein the circumferential profile region of the lifting cam that is assigned to the return stroke, together with the cam profile region assigned to the working stroke, has an overall extension of less than 360°.

6. The method according to claim 5, wherein the lifting cam has a further region that is also profiled in some regions thereof for a lifting process, but which further region has a profile configured to cause a lifting process of another workpiece type, another workpiece, or an earlier or later stroke cycle of the same workpiece, and/or for a working stroke with a flank modification of the shaped periodic structure.

7. The method according to claim 1 wherein the angular region of the lifting cam that is passed through in a stroke cycle is considered as a function of time, providing a periodic function that, as a function of time, correlates with the frequency of the stroke cycle.

8. The method according to claim 7, wherein the time derivative of the periodic function is sinusoidal or is a modulated sinusoidal wave.

9. The method of claim 7 wherein the periodic function is sinusoidal or is a modulated sinusoidal wave.

10. The method according to claim 1 wherein the quotient of the maximum amplitude of the angular velocity of the lifting cam and the cycle time re the stroke cycle, measuring in rpm/s, is less than 24.

11. The method according to claim 1 wherein the stroke rate, in strokes/min, is greater than 50.

12. The method according to claim 1 wherein the periodic function of the rotational angle of the lifting cam as a function of time includes four changes in the direction of curvature in a period.

13. The method according to claim 1 wherein the shaping tool is provided to a shaping head that is mounted pivotably about an axis, and the lifting of the shaping tool is effected by pivoting the shaping head.

14. The method according to claim 13 wherein the lifting mechanism has a preloaded pressure roller arranged between the lifting cam and the shaping head.

15. The method of claim 1 wherein said periodic structure comprises a toothing on the workpiece.

16. A shaping machine comprising:

a lifting mechanism;

a shaping tool;

a controller which has a control program configured to cause the lifting mechanism and shaping tool to carry out the method according to claim 1.

* * * * *